Nov. 29, 1949     H. ST. PIERRE     2,489,986
TIRE CHAIN KIT
Filed Jan. 25, 1947
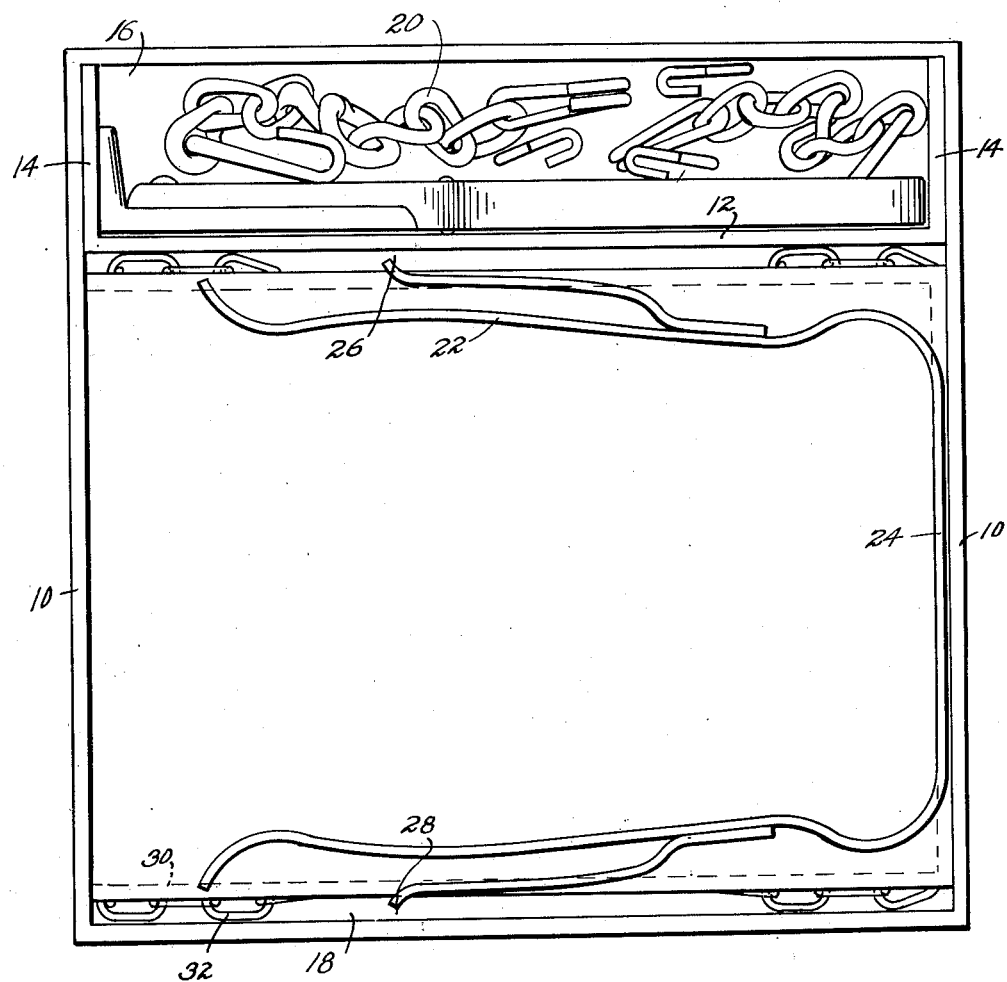
Inventor:
Henry St. Pierre
By Charles R. Fay,
Attorney

UNITED STATES PATENT OFFICE 2,489,986

TIRE CHAIN KIT

Henry St. Pierre, Worcester, Mass.

Application January 25, 1947, Serial No. 724,367

3 Claims. (Cl. 206—16)

This invention relates to new and useful tire chain kits and packages containing the same; and the principal object of the invention is to provide a kit or package containing and particularly adapted to receive a complete set of chains, repair chains and links, and tools for applying and repairing tire chains, so that no matter what eventuates in the way of wear, breakage, etc., the one handy kit will provide the user with means to apply and repair tire chains for use under any and all conditions.

Further objects of the invention include the provision of a case having a small compartment just long enough to receive a pair of chain pliers, and a set of spare cross-chains and repair links; and a larger compartment having a width to just receive a tire chain applying tool and of a length to receive a package containing an arm guard and a knee guard, said pliers, chain applying tool, and package assisting in maintaining the sides of the case in correct, original position; there being a set of regular tire chains in the larger compartment, whereby it will be seen that the single case provides against any and all road hazards and conditions for winter driving.

Other objects and advantages of the invention will appear hereinafter.

Reference is to be had to the accompanying drawings in which the figure is a top plan view of the kit with cover removed.

To carry out the invention I provide a box having a bottom and upturned side walls 10, there being a cover to telescope down over the box, this cover, however, not being shown. Adjacent one side or end of the box I provide a partition 12 having ears 14 bent to conform to the side walls and secured thereto as by staples or any other convenient means. The partition and its ears strengthen the box at this end and form a small compartment 16 and a larger compartment 18.

The compartment 16 is narrow and has a length sufficient to receive a pair of chain pliers longitudinally therein, these pliers being similar to those disclosed in my co-pending application S. N. 648,919, filed February 20, 1946. The chain pliers strengthen the box and maintain the ears 14 and the walls to which the latter are secured in spaced relation, in spite of the presence in the small compartment of a plurality of spare cross chains and repair links, indicated at 20. The small compartment contains everything necessary to chain repair, and the pliers and spare chain repair parts form a repair kit.

The reference numeral 22 indicates a tire chain applying tool made of springy material substantially as described in my co-pending application S. N. 648,918, filed February 20, 1946. This tool is in a general U-shape and contacts three sides of the box as at 24, 26, and 28, thus strengthening the side walls not directly impinged by the pliers. The dotted lines 30 indicate the extent of a package containing a sleeve guard, and a knee guard for use in applying and detaching the tire chains 32, so as to avoid soiling the clothes. The large compartment contains everything necessary to apply and detach a set of chains, as well as the chains themselves. The particular tire chains in the present kit are disclosed in detail in my co-pending application S. N. 672,350, filed May 27, 1946, and are provided with my finger tip fastener described therein.

The above described kit provides a box having two separate compartments, one for chain repair apparatus and the other for chain applying, each compartment being separately reinforced by the contents or parts thereof, and the contents of each compartment reinforcing walls of the other compartment.

The single kit provides chains and tools to meet every condition of weather and roads, and gives the driver a single, handy box or kit in which to keep all his tire chain needs.

The repair chains and links and the full set of chains are naturally disposed in more or less helter-skelter relation in the respective compartments, due to the nature of chains, but by separating the full chains and applying tool from the chain repair devices, the user knows just where to find what he wants for his purpose at the moment, whether for chain or link repair or for application of the full chains to the wheels of a vehicle. The applying tool will not fit in the smaller compartment, and must be placed in the larger compartment, so that no mixup is possible, and since there are but two chain tools, it is easily apparent that the pliers must be placed in the smaller compartment which just receives them.

Having thus described my invention and the advantages thereof, I do not wish to be limited to the details herein disclosed otherwise than is set forth in the claims, but what I claim is:

1. A tire chain kit comprising a box having two separate compartments, one of which is larger than the other, chains and a chain applying tool in the larger compartment, and repair chains and links and tire chain pliers in the smaller compartment, the chain applying tool being generally rectangular in outline and fitting the larger compartment and the pliers being elongated and fitting the smaller compartment, the latter having one dimension approximately the same as one of the dimensions of the larger compartment.

2. A tire chain kit comprising a rectangular box having upstanding side walls, a cross partition therein parallel to certain walls thereof, said partition being secured to opposite walls of the box and being closer to one parallel wall than to the other, the partition providing a small elongated compartment and a larger compartment approaching square conformation, a pair of tire chain pliers in the smaller compartment and extending end to end thereof, and a U-shaped tire chain applying tool in the larger compartment and extending substantially from side to side thereof, chain repair means in the smaller compartment with the tire chain pliers and tire chains in the larger compartment.

3. A tire chain application and repair kit comprising a paper box having upstanding side walls, a partition dividing the box into a smaller elongated compartment and a larger rectangular compartment, a pair of tire chain pliers in the smaller compartment and disposed longitudinally therein, and chain repair links in the smaller compartment, a chain applying tool in the larger compartment and a full set of chains in the larger compartment and the partition completely separating the repair devices from the set of chains and applying tool so that the tire chain user may be fully aware of which compartment to utilize for either purpose.

HENRY ST. PIERRE.

REFERENCES CITED

The following references are of record in the file of this patent:

UNITED STATES PATENTS

| Number | Name | Date |
|---|---|---|
| 83,997 | Rairigh | Nov. 10, 1868 |
| 1,350,237 | Porter | Aug. 17, 1920 |
| 1,514,885 | Bigler | Nov. 11, 1924 |
| 1,624,714 | Bullock | Apr. 12, 1927 |
| 1,913,950 | Platt | June 13, 1933 |
| 2,236,383 | Russell | Mar. 25, 1941 |